United States Patent [19]

Michelson

[11] Patent Number: 4,601,731

[45] Date of Patent: Jul. 22, 1986

[54] CHEVRON-TYPE MIST ELIMINATOR AND METHOD

[75] Inventor: Ilya Michelson, Brookline, Mass.

[73] Assignee: Koch Engineering Company, Inc., Wichita, Kans.

[21] Appl. No.: 751,149

[22] Filed: Jul. 2, 1985

[51] Int. Cl.[4] ............................................. B01D 45/08
[52] U.S. Cl. .................................... 55/1; 55/257 PV; 55/440
[58] Field of Search .... 55/257 PV, 257 QV, 257 NP, 55/257 PP, 440, 461–465; 261/112

[56] References Cited

U.S. PATENT DOCUMENTS

| | | | |
|---|---|---|---|
| 2,661,197 | 12/1953 | Norman | 261/112 |
| 3,084,918 | 4/1963 | Kohl et al. | 261/112 |
| 3,813,855 | 6/1974 | Hill et al. | 55/440 |
| 4,175,938 | 11/1979 | Regehr et al. | 55/440 |
| 4,204,847 | 5/1980 | Ko | 55/440 |

Primary Examiner—Bernard Nozick
Attorney, Agent, or Firm—Richard P. Crowley

[57] ABSTRACT

An improved mist eliminator for use in a column and a method for removing liquid from a gas stream, which mist eliminator comprises a plurality of spaced apart chevron-type baffle members, the baffle members defining a plurality of gas flow paths therebetween and transversely disposed to the axis of the column, the upstream leading edge of the chevron-type baffle members characterized by a plurality of downwardly extending drainage teeth or points thereon to promote the rapid drainage of coalescent liquid from the chevron-type baffle members thereby increasing the critical or maximum allowable velocity of the gas stream and the gas capacity of the chevron-type baffle members and decreasing the pressure drop across the mist eliminator.

11 Claims, 2 Drawing Figures

CHEVRON-TYPE MIST ELIMINATOR AND METHOD

BACKGROUND OF THE INVENTION

In many operations it is desirable or necessary to extract or remove a liquid mist or liquid particles from a gas stream in which the liquid mist or liquid particles are suspended or entrained. In some cases mist eliminators are used for the cleaning of waste or a dirty gas stream in a wet scrubber or other application, since the gas stream must be free or substantially free of the entrained liquid or mist before the gas stream can be discharged or used. In other cases the liquid forming the mist or liquid particles entrained in the gas stream is in itself useful and it is desired to remove the mist or liquid as a recovery product of the gas stream. In such operations mist eliminator devices are provided to remove or entrain liquid or mist from a mist-rich gas stream to provide a mist-lean gas stream.

Such mist eliminators include structured packing or packed beds wherein the structured packing or baffles employed are arranged in a zigzag or other configuration so as to provide for a zigzag or a tortuous flow path for the gas stream. It is desirable to have the gas stream change direction several times as it passes through the mist eliminator devices so that upon a change in the direction of the gas stream the mist or liquid particles impinge upon the surface of the baffle members, coalesce on the surface, and fall or drain downwardly out of the gas stream. Typically mist eliminator devices contain one or more layers of sheet-type baffles, such as C, S, W or Z blades, arranged in a zigzag, closely packed configuration. These eliminator devices usually comprise a plurality of baffle members in a spaced apart, generally parallel arrangement with gas passages between the individual baffle members to create the tortuous gas flow path. The baffle members typically have an upstream and downstream edge.

Generally, a layer of chevrons is placed in single or multiple layers across the diameter of a column and in such vertical flow chevron-type devices the liquid collected from the upwardly flowing gas stream must be removed from the chevron devices and typically drains down against the upwardly flowing gas streams. At high gas velocities the drag of the gas stream on the downwardly flowing liquid prevents good liquid drainage from the chevron-type baffles. At sufficiently high gas velocities (above the critical velocity or maximum allowable velocity) liquid accumulates on the chevron-type baffle surface and often between the closely spaced baffle members and some reentrainment of the liquid then occurs with the upwardly flowing gas stream.

The maximum gas capacity of a vertical flow chevron-type baffle mist eliminator is typically limited by the onset of reentrainment of the coalesced droplets back into the upwardly flowing gas stream downstream of the chevron device. It is desirable, therefor, to provide for an improved chevron-type mist eliminator and to prevent or reduce the reentrainment of coalesced droplets back into the upwardly flowing gas stream and to increase the critical velocity of the gas stream and gas capacity of the chevron-type device and to decrease the pressue drop across the mist eliminator.

SUMMARY OF THE INVENTION

The invention relates to a mist eliminator device, to columns containing the mist eliminator device and to a method of reducing the reentrainment of coalesced droplets of a mist eliminator device back into an upwardly flowing gas stream. In particular the invention concerns a vertical flow chevron baffle-type mist eliminator device characterized by improved drainage of coalesced liquids from the upstream edge and to a method of increasing the performance of chevron-type mist eliminators.

The invention relates to improved vertical flow chevron-type mist eliminators and method wherein the upstream or leading edge of the chevron-type mist eliminator presented to the mist-rich gas stream is characterized by one or preferably a plurality of downwardly extending drainage points or teeth, which drainage teeth serve as drip points and which substantially and unexpectedly enhance the chevron-type mist eliminator drainage to increase significantly the critical gas velocity, the chevron gas capacity, and to reduce the pressure drop involved in the improved chevron-type mist eliminator.

The maximum gas capacity of a chevron-type mist eliminator is typically limited by the onset of reentrainment of the coalesced droplets back into the flowing gas stream downstream of the leading or upstream edge of the chevron mist eliminator. The gas stream velocity at which reentrainment first occurs is called the "critical velocity" or "maximum allowable velocity" and correspondingly there is a factor called the "critical Fs" where Fs is equal to the product of the gas stream velocity and the square root of the gas density of the gas in the gas stream. A chevron-type mist eliminator cannot operate effectively when the actual Fs exceeds the critical Fs. The more effective a chevron-type mist eliminator is at draining coalesced liquid from the surface of its blade and from the gas flow path between the chevron blades the greater the gas capacity of the mist eliminator or in other words, the higher the critical velocity. Any improvement in liquid drainage also provides for improvement in the gas capacity of the mist eliminator.

It has been discovered that modifying the leading or upstream gas flow edge of a chevron-type mist eliminator such as by employing triangular drainage teeth on the upstream leading edge of all or substantially all of the chevron blade members presented to the upstream flowing gas stream with the teeth pointing downwardly into the gas stream to provide drip points or areas for the coalesced liquid, enhances drainage, increases the critical velocity and the gas capacity and also reduces the pressure drop across the mist eliminator. It has been found that the employment of a plurality of drainage points or teeth generally, uniformly spaced across the leading or upstream edge of the vertical blade of a generally vertically inclined blade into the gas stream provides for an incrase in gas capacity ranging from about more than 5 percent and typically 5 to 20 percent. Thus, the formation of defined generally downwardly tapered drip areas or points along the leading upstream edge of a chevron-type blade member mist eliminator such as by the employment of triangular or other shaped drainage points and typically although not necessarily uniformly spaced across the entire leading edge generally on each leading edge of each mist eliminator employed within a single layer provides the advantages of the present invention.

The improved chevron-type mist eliminators of the invention are generally employed in gas liquid contacting towers such as wet scrubbers or in other devices wherein it is desired to remove liquid particles from a mist-rich flowing gas, e.g. air, stream. Generally, the chevron-type mist eliminators are employed as a single, but may be employed in multiple, such as spaced apart, layers within the column and typically are closely spaced apart across a single layer the entire extent of the diameter of the column. The improved chevron-type mist eliminators may be employed as a roughing chevron layer for example the lower part of a column in combination with washing nozzles or may be employed as a polishing chevron layer in the upper portion of the column to provide higher efficiency or in both layers. The chevron-type mist eliminators may be used either alone or in a column or in connection with other gas-contact devices structured or nonstructured, for example packing, unimproved mist eliminators, or trays such as sieve, valve or jet trays or any other combination of gas liquid contacting or liquid distribution devices.

Generally mist eliminators are composed of flat sheets of either metal or plastic or combinations thereof and are formed and presented to the gas flow stream to provide a plurality of tortuous gas flow paths and to provide a barrier by the baffle members to the gas flow, so that the gas flow would impinge on the baffle members thereby providing a change in gas flow direction. Within the mist eliminator layer the mist or liquid particles impinge on the surface of the baffle members coalesce and flow downwardly. Where the leading edge of the mist eliminator does no contain drainage means and techniques of the invention then there is a tendency for the liquid to collect at the leading edge leading to increased pressure drop, blockage of the gas flow passage and reentrainment of the liquid into the gas flow stream.

The employment of the drainage points or teeth generally and preferably comprise a plurality of teeth uniformly spaced along the entire leading edge, the leading edge disposed into the gas stream and on each or at least every other member of the mist eliminator on each layer. The drainage points and techniques of the present invention may be employed in any variety of chevron-type mist eliminators to include: the standard C, W, S or Z-type blade, as well as proprietary-type mist eliminators, such as mist eliminators wherein the baffles are placed at an angle to each other of about 45 degrees to the upward vertical flow of the gas stream.

The improved mist eliminator of the invention is directed to a particular mist eliminator having for example three, four or more baffle members generally vertically or upwardly inclined from the axis of the column and which are disposed generally at a 45° angle to the upward gas flow of the gas stream and containing two, three or more generally vertical baffle members to define a vertical 45° chevron-type mist eliminator. The spacing between the individual mist eliminators may vary typically for example from ½ to 3 inches, for example from ½ to 1½ inches, while the length of mist eliminators also varies and typically may range from about 3 to 18 inches or more, e.g. 6 inches to 12 inches in vertical height. Generally, the chevron-type mist eliminator devics provide for a tortuous gas flow path which corresponds to the shape of the chevron-type mist eliminators employed. The mist eliminators may be placed generally vertical with the leading edge generally perpendicular to the gas flow stream or tilted at an angle: from about 0° to 20° from the horizontal plane perpendicular to the axis of the column. The 45° offset mist eliminators illustrated made from metal or plastic sheets exhibit good removal efficiency with low pressure drop, have a high gas capacity, low rendering to foul or plug, and are easily fabricated.

For the purposes of the invention the size, shape, and uniformity of the drainage points on the upstream edge of the mist eliminator baffles may vary. While in one embodiment it is desirable to provide drainage points or teeth of generally triangular shape, the drainage point means may be formed of points or teeth which may be triangular, rectangular, trapezoidal, semicircular, rhomboidal, square, diamond shaped, and fabricated or formed from a variety of construction materials. The term drainage point means is intended to cover and identify all types of sizes and shapes which perform the function of promoting rapid drainage of the chevron blades. The drainage points may be downwardly projecting points or wider areas where more rapid drainage of coalesced liquid occurs than in adjacent areas of the upstream edge of the baffles.

The improved drainage chevron-type mist eliminators of the invention may have the drainage points or areas, e.g. teeth cut from the leading edge of the mist eliminator or may have a separate piece attached to the leading edge of a standard mist eliminator to provide the drainage areas or points. The drainage teeth which define the drip points may vary in size and configuration and spacing along the leading edge. Generally, the drainage teeth should come to an apex or a sharp, round or blunt point and be generally uniform in shape and typically come to a point or have a point of ⅛ inch or less; that is, generally triangular or trapezoidal in nature. One or more drainage teeth may be at each drip point, and for example the leading edge may be composed of a plurality of small drip points, such as two to six points or teeth per linear edge length. While the baffle members making up the chevron-type mist eliminator generally comprise flat sheets, they may have corrugations and/or perforations therein or combinations thereof.

The invention will be described for the purposes of illustration only in connection with certain preferred embodiments; however, it is recognized that those persons skilled in the art may make various changes, additions, modifications, and improvements to the invention as described and illustrated, all falling within the spirit and scope of the invention.

DESCRIPTION OF THE EMBODIMENTS

Figure 1:
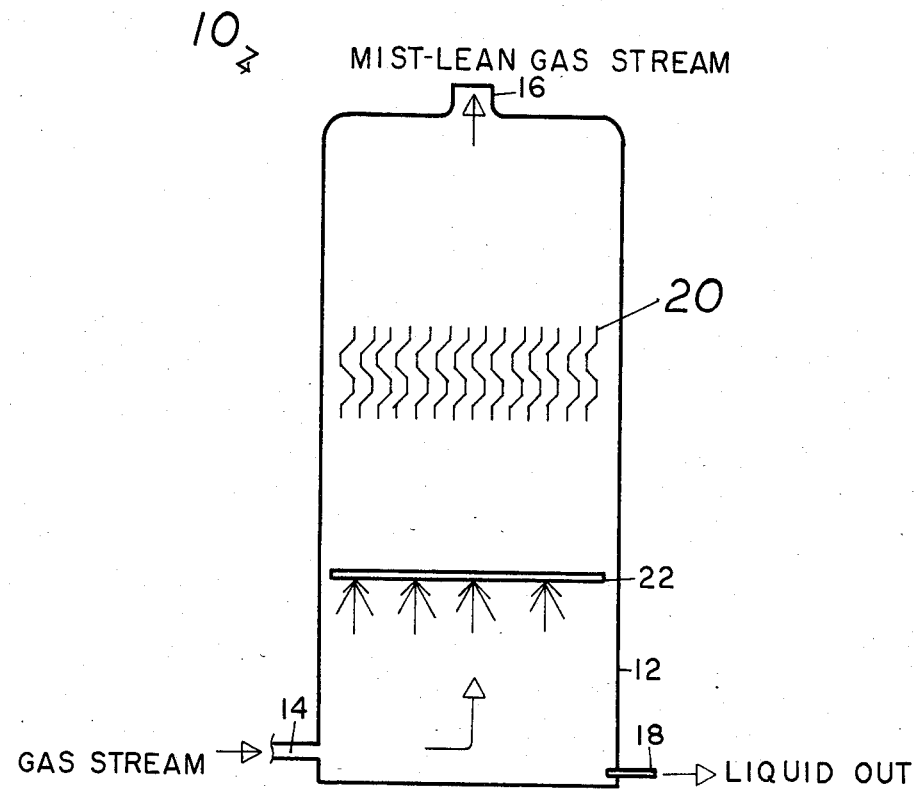
FIG. 1 is a illustrative schematic drawing of a wet scrubber column showing in cross section a layer of the improved chevron-type mist eliminators.

FIG. 1 shows a column such as a wet scrubber 10 employing the improved mist eliminators of the invention comprising a column 12, a gas inlet 14 for the introduction of a gas stream of a gas stream containing an acid gas, e.g. $SO_2$, $H_2S$, etc., gas stream which is to be wet scrubbed by alkali and then demisted, an outlet 16 to recover a mist-lean gas stream and a bottom liquid outlet 18 for the removal of coalesced and sprayed liquid. The column 12 includes spray scrubbers 22 and a layer of improved chevron-type mist eliminators 20 extending across the diameter of the column. The mist eliminator 20 is placed in a closely packed, spaced apart single layer and at an offset angle of between its axis and between zero and 20 degrees the longitudinal axis of the column.

Figure 2:
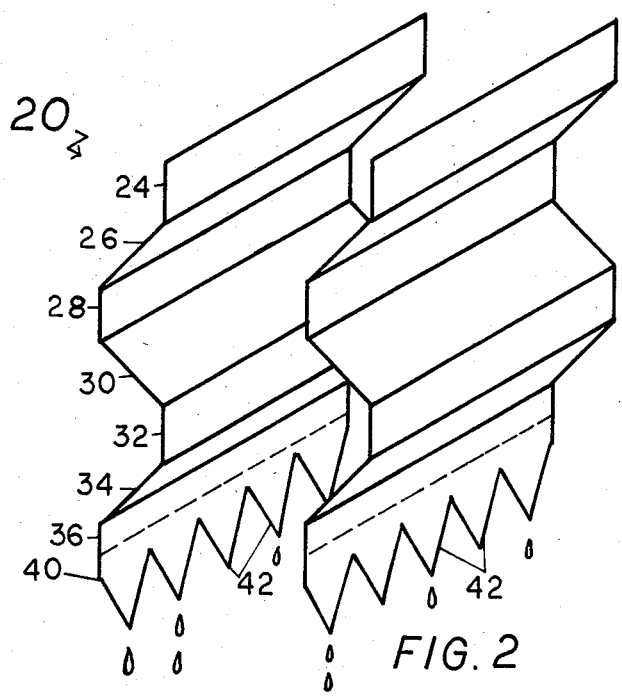
FIG. 2 is a enlarged perspective view of a pair of the improved mist eliminators as illustrated in FIG. 1.

FIG. 2 is a schematic perspective view of a pair of the improved chevron-type mist eliminator blades of the invention 20 in enlarged form. The chevron-type mist eliminators 20 shown in FIG. 2 define therebetween a tortuous gas flow path with a series of baffle plates at a 45° angle wth each other and the leading upstream and downstream edges of the chevron-type mist eliminator 20 aligned with or at a slight angle from the plane perpendicular to the longitudinal axis of the gas flow. The chevron-type mist eliminator 20 comprises generally vertical baffle plates 24 and 32 aligned in axial alignment and generally spaced apart and vertical offset baffle plates 28 and 36 in general vertical alignment alternating and connecting 45° angle baffle plates 26, 30 and 34. The lower upstream baffle plate 36 has a leading edge and as illustrated there is secured thereto by welding, bolts, etc. illustrated by the dotted lines a baffle plate 40 containing a plurality of generally triangular uniform drainage teeth 42 extending vertically downwardly into the vertical upflow of the gas stream. If desired, the drainage teeth may be simply cut from the lower leading upstream edge of the lower baffle plate 34, but a possible more economical arrangement is to precut the drainage teeth and then secure them to the lower leading edge of the chevron-type mist eliminator 20 which also permits upgrading of present mist eliminators.

The mist eliminator 20 thus provides for a continuous about 45° change in direction of the gas flow as the gas moves upwardly in between the chevron-type mist eliminator blades 20. As illustrated, triangular drainage teeth are positioned generally uniformly and of equal length across the entire leading edge. As illustrated, the drainage teeth come to a sharp point, are uniformly spaced, and have uniform triangular baffles extending across the full edge width of each of the mist eliminators 20 to enhance and optimize the gas capacity of the mist eliminator.

As illustrated, the vertical length of each of the baffle elements is approximately equal; however, this may vary as desired. For example, in a single chevron-type mist eliminator 20, the upright sections 28 and 32 may be of 1 to 2 inches, say 1½ inches, the angular sections 26, 30, and 34 from 2 to 3¼ inches, for example, 2¾ inches, while the upstream and downstream baffles 36 and 24 are typically 1 to 2½ inches, for example, 1½ inch. The bottom baffle 40 for example may be as short as ½ inch with the total vertical height of the chevron typically ranging from 6 to 12 inches and with the chevrons spaced apart ½ to 2 inch and extending across in a single layer across the width of the column in which they had to be disposed. The mist eliminators are often disposed with the leading edge of the mist eliminators with the drainage teeth 40 disposed at an angle of about up to 20° offset from the horizontal plane perpendicular to the vertical axis of the column 12.

The chevron-type mist eliminator 20 of the invention with the drainage teeth as illustrated was tested in a 1 foot wide and 1 foot high, i.e. 1 square foot transparent test column at an atmospheric pressure and a temperature of 70° F. with the result shown in the table below:

TABLE

| Chevron | $H_2O$ Mist Loading (gpm/ft²) | Without Drainage Teeth | | With Drainage Teeth | | % Increase In Capacity Attributable to Drainage Teeth |
|---|---|---|---|---|---|---|
| | | $V_{crit}$ (ft/sec) | $F_{s\ crit}$ | $V_{crit}$ (ft/sec) | $F_{s\ crit}$ | |
| A | 2.5 | 17.53 | 4.8 | 20.81 | 5.7 | 19% |
| B | 2.5 | 11.68 | 3.2 | 12.78 | 3.5 | 9% |
| C | 2.5 | 16.25 | 4.45 | 17.05 | 4.67 | 5% |
| D | 2.5 | 13.04 | 3.57 | 14.24 | 3.90 | 9% |

Chevron A was two chevron blades with one gas flow channel, chevron C was three chevron blades with two gas flow channels therebetween the chevrons spaced at 1½ inches between chevron blades, while chevron B represented a standard Z blade type chevron of two blades with one gas flow channel. Chevron D was 24 chevron blades with 23 gas flow channels in a 3 foot diameter column. The chevron D blade shape was as depicted in FIG. 2, with a blade spacing of 1.5 inches between adjacent blades. As indicated by the data, the employment of the drainage teeth on the upstream leading edge of the chevron-type mist eliminators increase the gas capacity of all the chevron style eliminators tested ranging from 5 to 19 percent. Visual observation during operation of the test tower indicated a rapid draining of the coalesced liquid from the drainage teeth on each of the chevrons, while in comparison chevrons without the drainage teeth became overloaded and the gas flow channel often blocked by the accumulation of liquid.

What is claimed is:
1. An apparatus for the removal of liquid from a mist-rich gas stream, which apparatus comprises:
   (a) a column;
   (b) inlet means to introduce a mist-rich gas stream to flow upwardly in the column;
   (c) outlet means to withdraw a mist-lean gas stream from the column, after removal of liquid coalesced from the mist-rich gas stream;
   (d) outlet means to remove liquid coalesced from the mist-rich gas stream from the column; and
   (e) mist-eliminator means in the column to coalesce liquid from the mist-rich gas stream, which means comprises
      (i) a layer composed of a plurality of parallel, spaced-apart, serpentine baffles extending across at least a part of the upwardly flowing gas path of the mist-rich gas stream, the baffles defining a plurality of tortuous gas flow paths therebetween,
      (ii) the layer of baffles substantially vertical to the axis of the column, the baffles having surfaces for the impingement of the upwardly flowing mist-rich gas stream, to provide for coalescing of the liquid thereon, and the baffles having a leading edge disposed upstream into the upwardly flowing gas path of the mist-rich gas stream, and
      (iii) downwardly projecting drainage-point means on the leading edge of the baffles, to promote the rapid drainage from the baffles of coalesced liquids, and to prevent the reentrainment of the coalesced liquid into the mist-lean gas stream.

2. The apparatus of claim 1 wherein the mist-eliminator means comprises a plurality of generally uniformly structured and spaced-apart drainage teeth disposed along the leading edge of the baffles.

3. The apparatus of claim 1 wherein the mist-eliminator means comprises a plurality of generally uniformly shaped, triangular teeth spaced along the upstream edge of the baffles.

4. The apparatus of claim 1 wherein the mist-eliminator means is substantially vertical, with the leading edge of the baffles at an angle of up to about 20° from the horizontal plane and perpendicular to the axis of the column.

5. The apparatus of claim 1 wherein the baffles of the mist-eliminator means are composed of a plurality of flat sheets disposed at an angle of about 45° from each adjoining flat sheet.

6. The apparatus of claim 1 wherein the baffles are spaced apart from each other from about ½ to 3 inches.

7. The apparatus of claim 1 wherein the baffles have a vertical length of about 3 to 18 inches.

8. The apparatus of claim 1 wherein the baffles are composed of four or more connected flat sheets, to include an upper and a lower flat sheet and intermediate flat sheets, each flat sheet disposed at an angle of about 45° from the adjacent flat sheet.

9. A method for removing liquid from a mist-rich gas stream, which method comprises:
 (a) introducing a mist-rich gas stream into the lower portion of a column for upward flow through the column;
 (b) withdrawing a mist-lean gas stream from the upper portion of the column;
 (c) withdrawing liquid coalesced from the mist-rich gas stream from a lower portion of the column; and
 (d) passing the mist-rich gas stream through an upwardly flowing tortuous flow path defined by a mist-eliminator layer composed of a plurality of substantially vertical, parallel, spaced-apart, serpentine baffles, the baffles having a leading upstream edge to the upwardly flowing gas stream, the baffles providing for a tortuous gas flow path of the mist-rich gas stream, the baffles having a surface for the impingement of the mist-rich gas stream on the baffle surface, to provide for coalescing of the liquid from the mist-rich gas stream, and the baffles having a plurality of downwardly projecting drainage points on the leading upstream edge of the baffles, to promote the rapid drainage of coalesced liquid from the baffle surface, thereby increasing the critical gas velocity of the upwardly flowing stream and preventing reentrainment into the mist-lean gas stream of the coalesced liquid from the baffle surface.

10. The method of claim 9 wherein the gas flow path through the mist eliminator changes direction at about a 45° angle at least four times in each mist-eliminator type.

11. The method of claim 9 which includes spacing the drainage points at regular, uniform intervals across substantially the entire leading edge of the baffles.

* * * * *